United States Patent
Tsuchiya et al.

(10) Patent No.: US 10,358,564 B2
(45) Date of Patent: Jul. 23, 2019

(54) RADIATION-CURABLE INK JET COMPOSITION AND INK JET RECORDING METHOD

(71) Applicant: Seiko Epson Corporation, Tokyo (JP)

(72) Inventors: Hitoshi Tsuchiya, Chino (JP); Keitaro Nakano, Matsumoto (JP); Toru Saito, Higashi-Chikuma (JP); Toshiyuki Yoda, Matsumoto (JP)

(73) Assignee: Seiko Epson Corporation (JP)

( * ) Notice: Subject to any disclaimer, the term of this patent is extended or adjusted under 35 U.S.C. 154(b) by 50 days.

(21) Appl. No.: 15/438,879

(22) Filed: Feb. 22, 2017

(65) Prior Publication Data

US 2017/0240754 A1 Aug. 24, 2017

(30) Foreign Application Priority Data

Feb. 23, 2016 (JP) .................. 2016-031692

(51) Int. Cl.

| | |
|---|---|
| *B41J 2/01* | (2006.01) |
| *B41J 11/00* | (2006.01) |
| *C09D 11/30* | (2014.01) |
| *C09D 11/38* | (2014.01) |
| *C09D 11/101* | (2014.01) |
| *C09D 11/107* | (2014.01) |
| *C09D 11/102* | (2014.01) |

(52) U.S. Cl.
CPC .............. *C09D 11/101* (2013.01); *B41J 2/01* (2013.01); *B41J 11/002* (2013.01); *C09D 11/102* (2013.01); *C09D 11/107* (2013.01); *C09D 11/30* (2013.01); *C09D 11/38* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 11/0015; B41J 11/002; B41J 2/2056; B41J 2/21; B41J 2/0057; B41J 3/60; B41J 2002/012; B41J 2/04598; B41J 2/04588; B41J 2/04595; B41J 2/04586; B41J 2/14274; C09D 11/36; C09D 11/40; C09D 11/30; C09D 11/38; C09D 11/322; C09D 11/328; C09D 11/101; C09D 11/54; C09D 11/52; C09D 11/005; B41M 5/0011; B41M 5/0017; B41M 7/00; B41M 7/0072; B41M 5/52; B41M 5/5218
See application file for complete search history.

(56) References Cited

U.S. PATENT DOCUMENTS

| | | | |
|---|---|---|---|
| 2006/0222832 A1* | 10/2006 | Shimohara | C09D 11/101 347/96 |
| 2011/0223391 A1* | 9/2011 | Nishimura | C09D 11/32 428/195.1 |
| 2012/0083545 A1* | 4/2012 | Kida | C09D 11/101 522/26 |
| 2012/0113201 A1* | 5/2012 | Kagose | B41J 2/2107 347/102 |
| 2012/0274717 A1* | 11/2012 | Nakano | B41J 2/2107 347/102 |
| 2013/0010039 A1* | 1/2013 | Kida | B41J 2/2107 347/100 |
| 2013/0258015 A1* | 10/2013 | Mizutaki | B41J 2/2107 347/102 |
| 2015/0225581 A1* | 8/2015 | Kida | C09D 11/101 522/26 |
| 2015/0315396 A1* | 11/2015 | Kida | B41J 2/2107 347/20 |
| 2016/0108268 A1* | 4/2016 | Nakano | B41J 2/2114 347/20 |

FOREIGN PATENT DOCUMENTS

JP 2012-162688 A 8/2012

OTHER PUBLICATIONS

Extended European Search Report for Patent Application No. EP17157561.6 dated Jun. 19, 2017 (7 pages).

* cited by examiner

*Primary Examiner* — Manish S Shah
(74) *Attorney, Agent, or Firm* — Harness, Dickey & Pierce, P.L.C.

(57) ABSTRACT

A radiation-curable ink jet composition contains monomer A represented by formula (1), a mono-, bi-, or trifunctional urethane (meth)acrylate oligomer, and an N-vinyl compound:

$$CH_2=CR^1-COOR^2-O-CH=CH-R^3 \quad (1)$$

where $R^1$ denotes —H or —$CH_3$, $R^2$ denotes an organic residue having 2 to 20 carbon atoms, and $R^3$ denotes a hydrogen atom or an organic residue having 1 to 11 carbon atoms.

19 Claims, No Drawings

RADIATION-CURABLE INK JET COMPOSITION AND INK JET RECORDING METHOD

BACKGROUND

1. Technical Field

The present invention relates to a radiation-curable ink jet composition and an ink jet recording method.

2. Related Art

Ink jet recording methods that use a radiation-curable ink jet composition, an ink jet composition containing a monomer that polymerizes (cures) in response to light, help achieving intended hardness and abrasion resistance of coatings and are suitable for various applications. Such recording methods are thus used in, for example, the production of color filters and printing (recording) on printed circuit boards, plastic cards, vinyl sheets, large-sized signage, and plastic components. In recent years, there is a need for radiation-curable ink jet compositions that give stretchable coatings and thus would allow for printing on curved surfaces and flexible substrates.

Some known radiation-curable ink jet compositions contain a compound having multiple reactive groups to give coatings with sufficient hardness and abrasion resistance.

For example, JP-A-2012-162688 proposes a light-curable ink jet ink composition that contains a bifunctional (meth)acrylate monomer of a particular structure and a urethane (meth)acrylate oligomer having three or more functionalities.

Unfortunately, this light-curable ink jet ink composition is disadvantageous in that increasing the hardness and abrasion resistance of coatings to a sufficient level often affects the stretchability of the coatings. More specifically, when the amount of the bifunctional (meth)acrylate monomer or the urethane (meth)acrylate oligomer having three or more functionalities is large, the coatings tend to be rigid and nonflexible because of an increased number of crosslinks in the coatings. This improves the hardness and abrasion resistance of the coatings, but in some cases can affect stretchability by reducing their room for expansion. Reducing the amounts of these ingredients improves the stretchability of the coatings, but may affect hardness and abrasion resistance.

SUMMARY

The following describes some aspects or exemplary applications of the invention.

Application 1

A radiation-curable ink jet composition according to this application contains monomer A represented by formula (1), a mono-, bi-, or trifunctional urethane (meth)acrylate oligomer, and an N-vinyl compound:

$$CH_2=CR^1-COOR^2-O-CH=CH-R^3 \quad (1)$$

where $R^1$ denotes —H or —$CH_3$, $R^2$ denotes an organic residue having 2 to 20 carbon atoms, and $R^3$ denotes a hydrogen atom or an organic residue having 1 to 11 carbon atoms.

This application improves the stretchability of coatings without compromising hardness and abrasion resistance. In other words, this application gives strength and flexibility to coatings formed from a radiation-curable ink jet composition.

Application 2

The radiation-curable ink jet composition according to the above application preferably contains N-vinylcaprolactam as the N-vinyl compound and at least one cyclic monofunctional (meth)acrylate monomer, with the N-vinylcaprolactam and the at least one cyclic monofunctional (meth)acrylate monomer representing 5% by mass or more and 15% by mass or less and 15% by mass or more and 50% by mass or less, respectively, of the total mass of the ink jet composition.

This improves the stretchability of coatings without compromising hardness and abrasion resistance. In other words, this gives strength and flexibility to coatings formed from a radiation-curable ink jet composition. More specifically, by virtue of containing predetermined amounts of N-vinylcaprolactam and cyclic monofunctional (meth)acrylate monomer(s), this ink jet composition gives coatings that can be made stronger (improved in hardness and abrasion resistance) without compromising stretchability. The N-vinylcaprolactam and cyclic monofunctional (meth)acrylate monomer(s) are both monofunctional and both have a ring of atoms. Their bulky rings improve the strength of the coatings, and their nature of being monofunctional controls the crosslink density. Combining these with the bifunctional monomer A provides strength and flexibility, improving the hardness and abrasion resistance as well as stretchability of the coatings.

Adding a predetermined amount of a bifunctional urethane (meth)acrylate oligomer along with the above two ingredients makes the coatings stronger and more flexible. This can be explained by the toughness given to the coatings through the characteristics of the urethane groups of the bifunctional urethane (meth)acrylate oligomer.

In this way, there is provided a radiation-curable ink jet composition that gives coatings with improved hardness, abrasion resistance, and stretchability.

Application 3

In the radiation-curable ink jet compositions according to the above applications, the monomer A preferably represents 13% by mass or more of the total mass of the ink jet composition.

By virtue of containing 13% by mass or more monomer A, this ink jet composition gives coatings with higher hardness and abrasion resistance and is of low viscosity.

Application 4

In the radiation-curable ink jet composition according to an above application, the at least one cyclic monofunctional (meth)acrylate monomer preferably includes at least one of phenoxyethyl (meth)acrylate, 2-hydroxy-3-phenoxypropyl (meth)acrylate, and benzyl (meth)acrylate.

By virtue of containing an aromatic monofunctional (meth)acrylate monomer, this ink jet composition more effectively dissolves an initiator and the oligomer and therefore can contain greater amounts of the initiator and the oligomer compared to one free from such monomers. The user can therefore provide desired characteristics to a radiation-curable ink jet composition. Furthermore, the ring contributes to the strength and flexibility of coatings.

Application 5

In the radiation-curable ink jet composition according to an above application, the at least one cyclic monofunctional (meth)acrylate monomer preferably includes at least one of isobornyl (meth)acrylate and dicyclopentanyl (meth)acrylate.

By virtue of containing a saturated alicyclic monofunctional (meth)acrylate monomer, this ink jet composition gives coatings with superior hardness. This ink jet composition therefore gives coatings with improved hardness, as compared to those formed from a radiation-curable ink jet composition in which the monofunctional (meth)acrylate monomer(s) is not saturated alicyclic, without compromising stretchability. Furthermore, this radiation-curable ink jet composition is of low viscosity.

Application 6

In the radiation-curable ink jet compositions according to the above applications, the monomer A is preferably 2-(2-vinyloxyethoxy)ethyl acrylate.

2-(2-Vinyloxyethoxy)ethyl acrylate, compared to other monomers having a 2-(vinyloxyethoxy)ethyl group, is effective in increasing curability in particular.

Application 7

The radiation-curable ink jet compositions according to the above applications preferably contain an acylphosphine oxide photopolymerization initiator, with the acylphosphine oxide photopolymerization initiator representing 3% by mass or more and 15% by mass or less of the total mass of the ink jet composition.

By virtue of containing 3% by mass or more and 15% by mass or less acylphosphine oxide photopolymerization initiator, this ink jet composition is of high photocurability because the initiator generates free radicals in response to the wavelengths of a UV-LED (ultraviolet-light emitting diode). Furthermore, this ink jet composition gives coatings with low initial pigmentation.

Application 8

The radiation-curable ink jet compositions according to the above applications are preferably cured with light from an ultraviolet-light emitting diode (UV-LED) having a peak emission wavelength of 365 nm to 405 nm.

By virtue of being cured with a ray of light with a peak wavelength of 365 nm to 405 nm, this ink jet composition fully benefits from the acylphosphine oxide photopolymerization initiator and therefore can be cured with less irradiation energy.

Application 9

An ink jet recording method according to this application includes irradiating a radiation-curable ink jet composition according to an above application with ultraviolet radiation on a recording medium.

DESCRIPTION OF EXEMPLARY EMBODIMENTS

The following describes an embodiment of the invention in detail. No aspects of the invention are limited to this embodiment, and various modifications can be made without departing from the scopes of those aspects of the invention.

As used herein, the term "(meth)acrylate" refers to an acrylate and/or the corresponding methacrylate, and the term "(meth)acrylic" means acrylic and/or the corresponding methacrylic.

Radiation-Curable Ink Jet Composition

A radiation-curable ink jet composition (hereinafter also simply referred to as an "ink jet composition" or a "composition") according to this embodiment is a composition that is to be ejected from an ink jet head by ink jetting. Ink jetting is a method in which droplets of an ink composition are ejected from nozzles of an ink jet head onto a recording medium. Although the following describes a radiation-curable ink jet ink composition (hereinafter also simply referred to as an "ink composition") as an embodiment of a radiation-curable ink jet composition, the composition does not need to be an ink composition; for example, it can be a composition for 3D object building. Likewise, although a composition may herein be described as "ultraviolet-curable" as an embodiment of a "radiation-curable" one, the composition in this embodiment can be any radiation-curable composition that cures in response to radiation; the expression ultraviolet-curable or ultraviolet-curable composition can be read as radiation-curable or radiation-curable composition. Examples of the radiation include ultraviolet radiation, infrared radiation, visible light, and X-rays. Judging from the availability and widespread use of radiation sources and materials suitable for curing, ultraviolet radiation is preferred.

The ink composition according to this embodiment forms a coating on a recording medium, such as a film, a sheet, paper, or fabric, by being applied to the recording medium and cured through ultraviolet irradiation.

A radiation-curable ink jet composition according to this embodiment contains monomer A represented by formula (1), a mono-, bi-, or trifunctional urethane (meth)acrylate oligomer, and an N-vinyl compound:

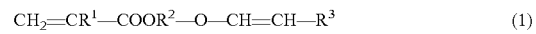

$$CH_2=CR^1-COOR^2-O-CH=CH-R^3 \qquad (1)$$

where $R^1$ denotes —H or —$CH_3$, $R^2$ denotes an organic residue having 2 to 20 carbon atoms, and $R^3$ denotes a hydrogen atom or an organic residue having 1 to 11 carbon atoms.

The following describes ingredients that may be contained in the radiation-curable ink jet composition according to this embodiment.

Polymerizable Compounds

The ink composition according to this embodiment contains monomers having a reactive group and an oligomer as polymerizable compounds. The polymerizable compounds cure the applied ink composition through a polymerization process catalyzed by a photopolymerization initiator (described hereinafter) when irradiated with ultraviolet radiation. The following describes each of these polymerizable compounds.

N-Vinyl Compound

The ink composition according to this embodiment contains an N-vinyl compound. By virtue of containing an N-vinyl compound as a polymerizable compound, the ink composition gives coatings with good stretchability, hardness, and abrasion resistance and is of low viscosity.

The N-vinyl compound is preferably a compound that has one vinyl group in its structure, preferably an N-vinyl lactam. Lactams help limiting the viscosity of the ink composition. The number of carbon atoms in the lactam ring is preferably between 2 and 7, more preferably between 3 and 7, even more preferably 4 or 6. The use of such a compound generally leads to good stretchability of coatings.

The lactam ring of the N-vinyl lactam may be substituted with alkyl, aryl, or some other group and may be connected to a saturated or unsaturated ring.

N-vinyl compounds can be used individually or as a combination of two or more.

Specific examples of N-vinyl compounds include, but are not limited to, N-vinylcaprolactam (N-vinyl-ε-caprolactam), N-vinyl-2-pyrrolidone, and their derivatives. N-vinylcaprolactam is particularly preferred.

The ink composition gives coatings with good stretchability, hardness, and abrasion resistance and is of low viscosity when containing N-vinylcaprolactam as a polymerizable compound.

The N-vinyl compound preferably represents 5% by mass or more and 15% by mass or less of the total mass of the ink composition (100% by mass), more preferably 6% by mass or more and 10% by mass or less. The ink composition is of low viscosity and gives coatings with superior stretchability, hardness, and abrasion resistance when its N-vinyl compound content falls within these ranges.

Cyclic Monofunctional (Meth) Acrylate Monomer

The ink composition according to this embodiment preferably contains a cyclic monofunctional (meth)acrylate monomer. When containing such a monofunctional (meth)acrylate monomer, the ink composition gives coatings with superior strength and flexibility, is of low viscosity, more effectively dissolves a photopolymerization initiator, the urethane (meth)acrylate oligomer, and other additives, and tends to be ejected with high stability in ink jet recording.

Examples of rings this cyclic monofunctional (meth)acrylate monomer can have include aromatic, saturated aliphatic, and unsaturated aliphatic rings. It is preferred that the ink composition contain a monofunctional (meth)acrylate monomer that has at least one structure selected from this group. The ink composition gives coatings with good stretchability, hardness, and abrasion resistance and is of low viscosity when the monofunctional (meth)acrylate monomer has such a structure (ring).

The aromatic monofunctional (meth)acrylate monomer can be any monofunctional (meth)acrylate monomer that has at least one aromatic ring in its structure. The aromatic ring may be substituted with alkyl, hydroxy, aryl, or some other group and may be connected to another aromatic ring or a saturated or unsaturated ring.

The aromatic ring may be bound either directly to the oxygen atom in the acryloyloxy group or with another moiety such as an alkylene group therebetween. The alkylene group may be substituted with alkyl, hydroxy, aryl, or some other group and may have an ester or ether linkage.

The ring may have any number of member atoms but preferably is a 6- to 18-membered ring.

It is preferred that the ink composition contain an aromatic monofunctional (meth)acrylic monomer because such an ink composition tends to give stretchable coatings and, if containing additives, more effectively dissolve the additives.

Examples of aromatic monofunctional (meth)acrylate monomers include phenoxyethyl (meth)acrylate, 2-hydroxy-3-phenoxypropyl (meth)acrylate, and benzyl (meth)acrylate. It is preferred that the ink composition contain at least one of phenoxyethyl (meth) acrylate and 2-hydroxy-3-phenoxypropyl (meth)acrylate. The ink composition gives stretchable coatings when containing these (meth)acrylates. It is preferred that these (meth)acrylates be contained because such an ink composition gives stretchable coatings, effectively dissolves additives if containing additives, and, more importantly, effectively dissolves photopolymerization initiators, acylphosphine oxide photopolymerization initiators in particular.

The aromatic monofunctional (meth)acrylate monomer preferably represents 5% by mass or more and 50% by mass or less of the total mass of the ink composition (100% by mass), more preferably 7% by mass or more and 40% by mass or less, even more preferably 10% by mass or more and 35% by mass or less, still more preferably 30% by mass or more and 35% by mass or less.

A saturated alicyclic monofunctional (meth)acrylate monomer is a monofunctional (meth)acrylate monomer that has at least one saturated aliphatic ring and no aromatic or unsaturated aliphatic rings in its structure. The saturated aliphatic ring can be of any kind in which all constituting carbon-carbon bonds are saturated. The ring may be substituted with alkyl, hydroxy, or some other group and may be connected to another saturated ring. The ring may include atoms of non-carbon elements, such as oxygen, sulfur, and nitrogen atoms, and may have non-carbon-carbon bonds, such as ether and ester linkages.

The ring may be bound either directly to the oxygen atom in the acryloyloxy group or with another moiety such as an alkylene group therebetween. The alkylene group may be substituted with alkyl, hydroxy, aryl, or some other group and may have an ester or ether linkage.

The ring may have any number of member atoms but preferably is a 3- to 20-membered ring.

It is preferred that the ink composition contain a saturated alicyclic monofunctional (meth)acrylic monomer because such an ink composition tends to give coatings with improved hardness and be of low viscosity.

It is preferred that the ink composition contain at least one of isobornyl (meth)acrylate and dicyclopentanyl (meth)acrylate, which are examples of saturated alicyclic monofunctional (meth)acrylate monomers. The ink composition gives coatings with improved hardness and is of low viscosity when containing these (meth)acrylates.

The saturated alicyclic monofunctional (meth)acrylate monomer preferably represents 3% by mass or more and 30% by mass or less of the total mass of the ink composition (100% by mass), more preferably 5% by mass or more and 20% by mass or less, even more preferably 10% by mass or more and 15% by mass or less.

An unsaturated alicyclic monofunctional (meth)acrylate monomer is a monofunctional (meth)acrylate monomer that has at least one unsaturated aliphatic ring and no aromatic or saturated aliphatic rings in its structure. The unsaturated aliphatic ring can be of any nonaromatic ring in which at least one constituting carbon-carbon bond is unsaturated. The ring may be substituted with alkyl, hydroxy, or some other group and may be connected to another saturated ring. The ring may include atoms of non-carbon elements, such as oxygen, sulfur, and nitrogen atoms, and may have non-carbon-carbon bonds, such as ether and ester linkages.

The ring may be bound either directly to the oxygen atom in the acryloyloxy group or with another moiety such as an alkylene group therebetween. The alkylene group may be substituted with alkyl, hydroxy, aryl, or some other group and may have an ester or ether linkage.

The ring may have any number of member atoms but preferably is a 3- to 20-membered ring.

The cyclic monofunctional (meth)acrylate monomer preferably represents 15% by mass or more and 50% by mass or less of the total mass of the ink composition (100% by mass), more preferably 20% by mass or more and 50% by mass or less.

Monomer A

Monomer A, a polymerizable compound essential for this embodiment, is represented by formula (1):

$$CH_2=CR^1-COOR^2-O-CH=CH-R^3 \qquad (1)$$

(where $R^1$ denotes —H or —$CH_3$, $R^2$ denotes an organic residue having 2 to 20 carbon atoms, and $R^3$ denotes a hydrogen atom or an organic residue having 1 to 11 carbon atoms).

By virtue of containing monomer A, the ink composition gives coatings with improved hardness. Monomer A also gives the ink good curability.

In monomer A of formula (1), the divalent organic residue having 2 to 20 carbon atoms, $R^2$, can be, for example, a linear, branched, or cyclic alkylene, an alkylene that has at least one of ether and ester linkages, a divalent aromatic ring, or a divalent aromatic ring substituted with a group having 6 to 11 carbon atoms. In particular, the following are suitably used: alkylenes having 2 to 6 carbon atoms, such as ethylene, n-propylene, isopropylene, and butylene; alkylenes that have 2 to 9 carbon atoms and an etheric oxygen atom in the structure, such as oxyethylene, oxy-n-propylene, oxyisopropylene, and oxybutylene.

In formula (1), the monovalent organic residue having 1 to 11 carbon atoms, $R^3$, can be, for example, a linear, branched, or cyclic alkyl, an aromatic ring, or an aromatic ring substituted with a group having 6 to 11 carbon atoms. In particular, the following are suitably used: the alkyls having 1 or 2 carbon atoms, i.e., methyl and ethyl; aromatic rings having 6 to 8 carbon atoms, such as phenyl and benzyl.

Substituents that these organic residues may have are divided into groups that contain carbon atom(s) and groups that do not. The number of carbon atoms of an organic residue substituted with a carbon-containing group includes the carbon atoms in this substituent. Examples of carbon-containing groups include, but are not limited to, carboxy and alkoxy. Examples of carbon-free groups include, but are not limited to, hydroxy and halo.

Specific examples of monomers A of formula (1) include, but are not limited to, 2-vinyloxyethyl (meth)acrylate, 3-vinyloxypropyl (meth)acrylate, 1-methyl-2-vinyloxyethyl (meth)acrylate, 2-vinyloxypropyl (meth)acrylate, 4-vinyloxybutyl (meth)acrylate, 1-methyl-3-vinyloxypropyl (meth)acrylate, 1-vinyloxymethylpropyl (meth)acrylate, 2-methyl-3-vinyloxypropyl (meth)acrylate, 1,1-dimethyl-2-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth)acrylate, 6-vinyloxyhexyl (meth)acrylate, 4-vinyloxymethylcyclohexylmethyl (meth)acrylate, 3-vinyloxymethylcyclohexylmethyl (meth)acrylate, 2-vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(vinyloxyethoxy)ethyl (meth)acrylate, 2-(vinyloxyisopropoxy)ethyl (meth)acrylate, 2-(vinyloxyethoxy)propyl (meth)acrylate, 2-(vinyloxyethoxy)isopropyl (meth)acrylate, 2-(vinyloxyisopropoxy)propyl (meth)acrylate, 2-(vinyloxyisopropoxy)isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy)propyl (meth)acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth)acrylate, 2-(vinyloxyethoxyethoxy)isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy) isopropyl (meth) acrylate, 2-(vinyloxyethoxyethoxyethoxy)ethyl (meth)acrylate, 2-(vinyloxyethoxyethoxyethoxyethoxy)ethyl (meth) acrylate, 2-(isopropenoxyethoxy)ethyl (meth)acrylate, 2-(isopropenoxyethoxyethoxy)ethyl (meth)acrylate, 2-(isopropenoxyethoxyethoxyethoxy)ethyl (meth)acrylate, 2-(isopropenoxyethoxyethoxyethoxyethoxy)ethyl (meth) acrylate, polyethylene glycol monovinyl ether (meth)acrylate, and polypropylene glycol monovinyl ether (meth) acrylate.

Of these, the following are preferred: 2-vinyloxyethyl (meth)acrylate, 3-vinyloxypropyl (meth) acrylate, 1-methyl-2-vinyloxyethyl (meth) acrylate, 2-vinyloxypropyl (meth) acrylate, 4-vinyloxybutyl (meth)acrylate, 4-vinyloxycyclohexyl (meth)acrylate, 5-vinyloxypentyl (meth)acrylate, 6-vinyloxyhexyl (meth)acrylate, 4-vinyloxymethylcyclohexylmethyl (meth) acrylate, p-vinyloxymethylphenylmethyl (meth) acrylate, 2-(vinyloxyethoxy)ethyl (meth)acrylate, 2-(vinyloxyethoxyethoxy)ethyl (meth) acrylate, and 2-(vinyloxyethoxyethoxyethoxy)ethyl (meth)acrylate.

2-(Vinyloxyethoxy)ethyl (meth)acrylate is particularly preferred by virtue of its low viscosity, high flash point, and superior curability. Examples of 2-(vinyloxyethoxy)ethyl (meth)acrylates include 2-(2-vinyloxyethoxy)ethyl (meth) acrylate and 2-(1-vinyloxyethoxy)ethyl (meth)acrylate.

Monomer A preferably represents 5% by mass or more of the total mass of the ink composition (100% by mass), more preferably 10% by mass or more, even more preferably 13% by mass or more. The curability, in particular, of the ink is good when the monomer A content falls within these ranges. The ink composition according to this embodiment also contains an N-vinyl compound and a mono-, bi-, or trifunctional urethane (meth)acrylate oligomer. The viscosity of the ink composition could be increased and the curability impaired due to the presence of these ingredients, but when the monomer A content falls within these ranges, the ink composition is satisfactory in these characteristics too. Furthermore, the N-vinyl compound and the mono-, bi-, or trifunctional urethane (meth)acrylate oligomer may be poorly compatible with each other in some cases, but the presence of such an amount of monomer A generally leads to good compatibility between these two ingredients, thereby retarding the formation of impurities. The monomer A content is preferably 30% by mass or less, more preferably 20% by mass or more and 30% by mass or less. The curability, in particular, of the ink is good when the monomer A content falls within these ranges. A monomer A content of 20% by mass or more is preferred over less than 20% by mass in reducing the viscosity of the ink and in the curability of the ink.

Monomer A contributes to low viscosity and improved curability when its abundance is 10% by mass or more. Controlling the monomer A content to 30% by mass or less is preferred because this increases the relative amounts of the other ingredients. For example, this allows the ink composition to contain more good solvent for a polymerization initiator, such as phenoxyethyl acrylate. The largest possible amount of a polymerization initiator is increased, which improves curability.

Examples of processes for the production of monomer A of formula (1) include, but are not limited to, esterifying (meth)acrylic acid and a hydroxy-containing vinyl ether (process B), esterifying (meth)acrylic acid halide and a hydroxy-containing vinyl ether (process C), esterifying (meth)acrylic acid anhydride and a hydroxy-containing vinyl ether (process D), transesterifying (meth)acrylate and a hydroxy-containing vinyl ether (process E), esterifying (meth)acrylic acid and a halogen-containing vinyl ether (process F), esterifying a (meth)acrylic acid-alkali (or alkaline-earth) metal salt and a halogen-containing vinyl ether (process G), transvinylating a hydroxy-containing (meth) acrylate and vinyl carboxylate (process H), and transetherifying a hydroxy-containing (meth)acrylate and an alkyl vinyl ether (process I). Process E, which allows the ink composition to achieve its advantages of low viscosity and curability in this embodiment, is more preferred than the other processes. Mono-, Bi-, or Trifunctional Urethane (Meth)acrylate Oligomer The ink composition according to this embodiment contains a mono-, bi-, or trifunctional urethane (meth)acrylate oligomer. The mono-, bi-, or trifunctional urethane (meth) acrylate oligomer has a backbone that contains more than one urethane group (urethane linkage) resulting from the addition reaction between a polyol and a polyisocyanate (the urethane groups and the moieties connected thereby). The oligomer also has one to three (meth)acrylic groups, whether terminal or pendant. By virtue of containing the mono-, bi-, or trifunctional urethane (meth)acrylate oligomer, the ink composition contains an increased number of acrylic groups. The acrylic groups actively react with the vinyl ether in monomer A, represented by formula (1), increasing the curing speed. As a result, the curability is improved. Making the number of (meth)acrylic groups three or less is preferred because this leads to good curability. The number of (meth) acrylic groups is preferably two or less, more preferably two, as this leads to improved flexibility of coatings as well as good curability. Although there is a trade-off between the curability and the flexibility of coatings when the number of functionalities is increased or reduced, the use of a bifunctional urethane (meth)acrylate oligomer advantageously leads to better curability and better flexibility of coatings.

The mono-, bi-, or trifunctional urethane (meth)acrylate oligomer preferably represents 5% by mass or more and 20% by mass or less of the ink composition, preferably 5% by mass or more and 15% by mass or less, preferably 5% by mass or more and 10% by mass or less. The ink composition gives coatings with flexibility and durability (hardness) when the oligomer is present in such an amount. When the oligomer content is 5% by mass or more, the ink composition gives coatings with sufficient flexibility and is highly curable. When the oligomer content is 10% by mass or less, the ink is of low viscosity and therefore is good for ejection from an ink jet head.

The mono-, di-, or trifunctional urethane (meth)acrylate oligomer is preferably an aliphatic urethane (meth)acrylate oligomer, which has an alkyl or alkylene backbone and no aromatic rings. The alkyl group can be a linear, branched, or nonaromatic cyclic one. The backbone may be substituted. When containing an aliphatic urethane (meth)acrylate oligomer, the ink composition gives coatings with higher flexibility and therefore is advantageous particularly in making flexible printings. The flexibility is improved with less branches, more linearity, and increasing number of carbon atoms in the alkyl or alkylene group.

The mono-, di-, or trifunctional urethane (meth)acrylate oligomer can be a commercial product. Examples of commercially available bifunctional urethane (meth)acrylate oligomers, for example, include EBECRYL 230, EBECRYL 244, EBECRYL 245, EBECRYL 270, EBECRYL 280/15IB, EBECRYL 284, EBECRYL 285, EBECRYL 4858, EBECRYL 8307, EBECRYL 8402, EBECRYL 8411, EBECRYL 8804, EBECRYL 8807, EBECRYL 9270, and KRM7735 (Daicel Cytec), CN961, CN961E75, CN961H81, CN962, CN963, CN963A80, CN963B80, CN963E75, CN963E80, CN963J85, CN964, CN964A85, CN964E75, CN965, CN965A80, CN966, CN966A80, CN966B85, CN966H90, CN966J75, CN966R60, CN980, CN981, CN981A75, CN981B88, CN982, CN982A75, CN982B88, CN982E75, CN983, CN985B88, CN989, CN991, CN996, CN9001, CN9002, CN9788, and CN9893 (Sartomer), and GENOMER 4215, GENOMER 4269/M22, and GENOMER 4297 (Rahn AG).

Other Polymerizable Compounds

Besides the above polymerizable compounds, the ink composition may contain esters of (meth)acrylic acid, i.e., (meth)acrylates.

Of such (meth)acrylates, examples of monofunctional (meth)acrylates include isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethylhexyl-diglycol (meth)acrylate, 2-hydroxybutyl (meth)acrylate, butoxyethyl (meth)acrylate, ethoxydiethylene glycol (meth) acrylate, methoxydiethylene glycol (meth)acrylate, methoxypolyethylene glycol (meth) acrylate, methoxypropylene glycol (meth)acrylate, tetrahydrofurfuryl (meth)acrylate, 2-hydroxyethyl (meth)acrylate, 2-hydroxypropyl (meth)acrylate, and, lactone-modified flexible (meth)acrylate.

For bifunctional (meth)acrylates, examples include triethylene glycol di(meth)acrylate, tetraethylene glycol di(meth) acrylate, polyethylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth) acrylate, bisphenol A EO (ethylene oxide) adduct di(meth) acrylate, bisphenol A PO (propylene oxide) adduct di(meth) acrylate, hydroxypivalic acid neopentyl glycol di(meth) acrylate, and polytetramethylene glycol di(meth)acrylate.

As for multifunctional (meth)acrylates having three or more functionalities, examples include trimethylolpropane tri(meth)acrylate, EO-modified trimethylolpropane tri (meth)acrylate, pentaerythritol tri(meth)acrylate, pentaerythritol tetra(meth)acrylate, dipentaerythritol hexa (meth) acrylate, ditrimethylolpropane tetra(meth) acrylate, glycerol propoxy tri(meth)acrylate, caprolactone-modified trimethylolpropane tri(meth)acrylate, pentaerythritol ethoxy tetra(meth)acrylate, and caprolactam-modified dipentaerythritol hexa(meth)acrylate.

Photopolymerization Initiator

A photopolymerization initiator contained in the ink composition according to this embodiment initiates the polymerization of the polymerizable compounds in response to ultraviolet radiation. Through this, the ink composition cures, and a coating is formed. The photopolymerization initiator generates an active species, such as a free radical or a cation, using the energy of the ultraviolet radiation and thereby starts the polymerization of the polymerizable compounds. Such an active species can be generated using, for example, a free-radical photopolymerization initiator or a cationic photopolymerization initiator. In particular, it is preferred to use a free-radical photopolymerization initiator. Free-radical photopolymerization initiators are faster curing agents and can be used with a broader range of monomers. Furthermore, ultraviolet radiation (UV) is superior to other types of radiation in terms of safety and light-source cost.

Examples of free-radical photopolymerization initiators include aromatic ketones, acylphosphine oxide compounds, aromatic onium salt compounds, organic peroxides, thio compounds (e.g., thioxanthone compounds and thiophenyl-containing compounds), hexaarylbiimidazole compounds, ketoxime ester compounds, borate compounds, azinium compounds, metallocene compounds, active ester compounds, compounds that have a carbon-halogen bond, and alkylamine compounds.

In particular, acylphosphine oxide compounds are preferred because they give the ink composition good curability.

Specific examples of acylphosphine oxide photopolymerization initiators include bis(2,4,6-trimethylbenzoyl)-phenylphosphine oxide, 2,4,6-trimethylbenzoyl-diphenyl-phosphine oxide, and bis-(2,6-dimethoxybenzoyl)-2,4,4-trimethylpentylphosphine oxide. These compounds generate the aforementioned active species when exposed to a ray of ultraviolet radiation that has a peak emission wavelength of 365 nm to 405 nm (described hereinafter). The ink composition can therefore be cured using an ultraviolet-light emitting diode (UV-LED) with a peak emission wavelength of 365 nm to 405 nm when containing such a compound.

Commercial acylphosphine oxide compounds can also be used. Specific examples include IRGACURE 819 (a trade name of BASF; bis(2,4,6-trimethylbenzoyl)-phenylphosphine oxide), IRGACURE TPO (a trade name of BASF; 2,4,6-trimethylbenzoyl-diphenyl-phosphine oxide), and DAROCUR TPO (a trade name of BASF; 2,4,6-trimethylbenzoyl-diphenyl-phosphine oxide). In particular, IRGACURE 819 (bis(2,4,6-trimethylbenzoyl)-phenylphosphine oxide) and IRGACURE TPO (2,4,6-trimethylbenzoyl-diphenyl-phosphine oxide) are preferred because they are highly soluble in the ink composition and highly effective in improving the curability of the ink composition.

These acylphosphine oxide compounds can be used individually or in combination. In particular, a combination of IRGACURE 819 (bis(2,4,6-trimethylbenzoyl)-phenylphosphine oxide) and IRGACURE TPO (2,4,6-trimethylbenzoyl-diphenyl-phosphine oxide) is advantageously greatly soluble in the ink composition and significantly effective in improving the curability of the ink composition.

The acylphosphine oxide compound (acylphosphine oxide photopolymerization initiator) content of the ink composition is preferably 3% by mass or more and 15% by mass or less, more preferably 5% by mass or more and 15% by mass or less. The ink offers further improved curability and gives coatings with low initial pigmentation when its acylphosphine oxide content falls within these ranges.

Examples of thioxanthone compounds used as photopolymerization initiators include thioxanthone, diethylthioxanthone, isopropylthioxanthone, chlorothioxanthone, 2,4-diethylthioxanthone, 2-isopropylthioxanthone, and 2-chlorothioxanthone.

Commercial thioxanthone compounds can also be used. Specific examples include Speedcure DETX (2,4-diethylthioxanthone) and Speedcure ITX (2-isopropylthioxanthone) (Lambson) and KAYACURE DETX (2,4-diethylthioxanthone) (Nippon Kayaku Co., Ltd.).

Thioxanthone compounds are used in combination with an acylphosphine oxide compound. It is possible to use at least one thioxanthone compound.

The thioxanthone compound content of the ink composition is preferably 1% by mass or more and 3% by mass or less. The ink composition offers further improved curability and gives coatings with low initial pigmentation when its thioxanthone compound content falls within this range.

The addition of photopolymerization initiator(s) can be omitted by using photopolymerizable compounds. However, the use of a photopolymerization initiator is preferred. It is an easy way to control the time when the polymerization should start.

Coloring Material

The ink composition according to this embodiment may further contain a coloring material. The coloring material can be a pigment or a dye, and it is also possible to use both. The ink composition gives colored coatings when containing a coloring material. Such an ink composition allows the user to form images, patterns, text, colors, or other graphics on recording media using the coatings.

The ink composition offers improved light resistance when the coloring material is a pigment. Both inorganic and organic pigments can be used.

Examples of inorganic pigments that can be used include carbon blacks (C.I. Pigment Black 7) such as furnace black, lamp black, acetylene black, and channel black, iron oxide, and titanium oxide.

Examples of organic pigments include azo pigments such as insoluble azo pigments, condensed azo pigments, azo lakes, and chelate azo pigments, polycyclic pigments such as phthalocyanine pigments, perylene and perinone pigments, anthraquinone pigments, quinacridone pigments, dioxane pigments, thioindigo pigments, isoindolinone pigments, and quinophthalone pigments, dye chelates (e.g., basic-dye chelates and acid-dye chelates), dye lakes (basic-dye lakes and acid-dye lakes), nitro pigments, nitroso pigments, aniline black, and daylight fluorescent pigments.

More specifically, examples of carbon blacks used as black inks include No. 2300, No. 900, MCF88, No. 33, No. 40, No. 45, No. 52, MA7, MA8, MA100, and No. 2200B (Mitsubishi Chemical Corporation), Raven 5750, Raven 5250, Raven 5000, Raven 3500, Raven 1255, and Raven 700 (Carbon Columbia), Regal 400R, Regal 330R, Regal 660R, Mogul L, Monarch 700, Monarch 800, Monarch 880, Monarch 900, Monarch 1000, Monarch 1100, Monarch 1300, and Monarch 1400 (CABOT JAPAN K.K.), Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, and Special Black 4 (Degussa).

Examples of pigments used in white inks include C.I. (Colour Index Generic Name) Pigment White 6, 18, and 21.

Examples of pigments used in yellow inks include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 167, C.I. Pigment Yellow 172, and C.I. Pigment Yellow 180.

Examples of pigments used in magenta inks include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48 (Ca), C.I. Pigment Red 48 (Mn), C.I. Pigment Red 57 (Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I.

Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, and C.I. Pigment Red 245 and C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Examples of pigments used in cyan inks include C.I. Pigment Blue 1, C.I. Pigment Blue 2, C.I. Pigment Blue 3, C.I. Pigment Blue 15, C.I. Pigment Blue 15:1, C.I. Pigment Blue 15:2, C.I. Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, and C.I. Pigment Blue 66 and C.I. Vat Blue 4 and C.I. Vat Blue 60.

Examples of other pigments include C.I. Pigment Green 7 and C.I. Pigment Green 10, C.I. Pigment Brown 3, C.I. Pigment Brown 5, C.I. Pigment Brown 25, and C.I. Pigment Brown 26, and C.I. Pigment Orange 1, C.I. Pigment Orange 2, C.I. Pigment Orange 5, C.I. Pigment Orange 7, C.I. Pigment Orange 13, C.I. Pigment Orange 14, C.I. Pigment Orange 15, C.I. Pigment Orange 16, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 63.

These pigments may be used individually or as a combination of two or more.

The average diameter of the particles of the pigment, if used, is preferably 300 nm or less, more preferably 50 nm or more and 200 nm or less. The pigment is even more reliable, allowing for more stable ejection of the ink composition and dispersed in a more stable manner in the ink composition for example, and forms images with higher quality when its average particle diameter falls within these ranges. The average particle diameter mentioned herein is measured by dynamic light scattering.

Dyes that can be used are not limited to any particular kind. For example, acid dyes, direct dyes, reactive dyes, and basic dyes can be used. Examples of such dyes include C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35. These dyes can be used individually or as a combination of two or more.

The coloring material content is preferably 1% by mass or more and 20% by mass or less of the total mass of the ink composition. This leads to superior masking properties and color development.

Dispersant

When containing a pigment, the ink composition may contain a dispersant to help the pigment spreading in the ink composition. Examples of dispersants that can be used include, but are not limited to, those that are commonly used in the preparation of a liquid pigment dispersion, such as polymeric dispersants. Specific examples include dispersants in which one or more of the following are the main ingredients: polyoxyalkylene polyalkylene polyamines, vinyl polymers and copolymers, acrylic polymers and copolymers, polyesters, polyamides, polyimides, polyurethanes, amino polymers, silicon-containing polymers, sulfur-containing polymers, fluorine-containing polymers, and epoxy resin. Examples of commercial polymeric dispersants include Ajinomoto Fine-Techno AJISPER dispersants, Solsperse dispersants (e.g., Solsperse 36000) available from Avecia Co., BYK Additives & Instruments DISPERBYK dispersants, and Kusumoto Chemicals DISPARLON dispersants.

Slipping Agent

The ink composition according to this embodiment may contain a slipping agent (surfactant) to improve the abrasion resistance. Examples of slipping agents that can be used include, but are not limited to, silicone surfactants, such as polyester- or polyether-modified silicones. Preferably, a polyester- or polyether-modified polydimethylsiloxane is used. Specific examples include BYK-347, BYK-348, BYK-UV3500, 3510, 3530, and 3570 (BYK Additives & Instruments).

Other Additives

The ink composition according to this embodiment may contain other additives (ingredients). Examples of such ingredients include, but are not limited to, known polymerization accelerators, penetration enhancers, moisturizing agents (humectants), polymerization inhibitors, fixatives, antimolds, preservatives, antioxidants, ultraviolet absorbers, chelating agents, pH-adjusting agents, and thickeners.

Characteristics of the Ink Composition

The following describes the characteristics of the ink composition.

The ink composition according to this embodiment can be prepared by mixing the above ingredients in any order and optionally removing unwanted materials such as impurities and foreign substances through filtration or some other process. The mixing of the ingredients is done through the stirring and mixing of materials sequentially added to a container equipped with a stirrer such as a mechanical stirrer or a magnetic stirrer. The method of filtration can be centrifugal filtration or screen filtration, for example. The following describes the ink viscosity of an ink composition produced by this method.

Viscosity

The viscosity of the ink composition is preferably less than 30 mPa·s at 20° C., more preferably 5 mPa·s or more and less than 20 mPa·s. The ink composition more effectively dissolves photopolymerization initiators and other additives and tends to be ejected with higher stability in ink jet recording when its viscosity falls within these ranges. A possible method for the measurement of the viscosity of the ink composition is a rheometric test using MCR-300 rheometer (Physica), in which under 20° C. conditions the shear rate is increased from 10 s$^{-1}$ to 1000 s$^{-1}$ and the viscosity is read at a shear rate of 200 s.

Curability

The ink composition quickly cures and forms a coating when exposed to a predetermined type of ultraviolet radiation. This nature is referred to as curability.

With regard to the curability of the ink composition, it is preferred that the irradiation energy required to cure the ink composition be less than 300 mJ/cm$^2$, more preferably less than 200 mJ/cm$^2$. The irradiation energy is the product of the duration of irradiation and the irradiation dose. The formula of the ink composition according to this embodiment can be modified to shorten the duration of irradiation, and this leads to an increased printing speed. The formula of the ink composition according to this embodiment can also be modified to reduce the irradiation dose, and this leads to system size and cost reduction. The ultraviolet source is preferably a UV-LED.

Characteristics of Coatings

The following describes the coatings the ink composition forms.

The ink composition forms a coating as follows. First, the ink composition is applied to a recording medium using an ink jet recording apparatus. The ink composition on the recording medium is then irradiated with light, and this makes the ink composition cure into a coating. Examples of important characteristics of the resulting coatings include stretchability, hardness, and abrasion resistance. The following describes these characteristics.

Stretchability

The stretchability of the coatings the ink composition forms is preferably 80% or more and less than 120%, more preferably 120% or more. When the stretchability of the coatings falls within these ranges, the recordings can be pasted to curved surfaces and uneven substrates by virtue of the increased flexibility of the coatings. The stretchability of the coatings can be measured as a percent elongation of the coatings using a tensile tester (ORIENTEC TENSILON). The percent elongation of a coating can be measured by stretching the coating using this tensile tester and reading the percent elongation at which the coating cracks. The reading is taken as the value of the stretchability of the coating.

Hardness

The hardness of the coatings is preferably a pencil hardness of 2B or harder, more preferably HB or harder. When their hardness falls within these ranges, the coatings are more resistant to damage from contact with any harder material by virtue of their increased strength. The pencil hardness of a coating can be measured using a pencil hardness tester (Allgood) in accordance with JIS K5600-5-4, Scratch hardness (Pencil method). The surface of the coating is visually inspected after testing, and the hardness of the hardest pencil that leaves no scratches is taken as the hardness of the coating.

Abrasion Resistance

With regard to the abrasion resistance of the coatings, it is preferred that rubbing a coated recording surface with a piece of bond paper do not remove or damage the coating, more preferably with no transfer to the piece of bond paper. Giving such a degree of abrasion resistance makes the coatings more resistant to damage from rubbing against any other formed thing after image formation and allows the coatings to maintain its appearance. A possible method for the measurement of the abrasion resistance of a coating is a test using a color fastness rubbing tester (TESTER SANGYO CO., LTD.), in which the surface of the coating is rubbed with a piece of bond paper under a load of 500 g and then the appearance of the coating is visually inspected.

Recording Medium

The following describes a recording medium, to which the ink composition is applied by ink jetting. The recording medium and the applied ink composition form a coated recording. Examples of recording media include absorbent and nonabsorbent media. The ink composition according to this embodiment can be applied to a wide variety of recording media with different absorption properties from nonabsorbent recording media, into which aqueous inks hardly penetrate, to absorbent recording media, into which aqueous inks penetrate easily. When the ink composition is applied to a nonabsorbent recording medium, it is preferred that the ultraviolet-cured coatings be dried.

Examples of absorbent recording media include, but are not limited to, paper highly penetrable with aqueous inks, such as electrophotographic paper and other kinds of plain paper and ink jet printing paper (dedicated paper for ink jet printing, which has an ink-absorbing layer that contains silica or alumina particles or a hydrophilic polymer such as polyvinyl alcohol or polyvinyl pyrrolidone) and paper relatively impenetrable with aqueous inks, such as art paper, coated paper, cast-coated paper, and other kinds of paper for ordinary offset printing.

Examples of nonabsorbent recording media include, but are not limited to, films and plates of plastics such as polyvinyl chloride, polyethylene, polypropylene, and polyethylene terephthalate, plates of metals such as iron, silver, copper, and aluminum, metal plates or plastic films with deposited coatings of such metals, and plates of alloys such as stainless steel and brass.

Ink Jet Recording Method

The ultraviolet-curable ink jet ink composition according to this embodiment can be used in the ink jet recording method as a form of ink jetting. The ink jet recording method includes ejection, in which the ink composition is ejected and applied to a recording medium, and curing, in which the applied ink composition is cured through irradiation with ultraviolet radiation. Through this, the ink composition cured on the recording medium forms a coating. The following describes the individual operations.

Ejection

First, the ink composition is ejected through nozzles of a head. The method of ejection can be, for example, the piezo method or the method in which bubbles formed by heating the ink composition are used to eject the ink composition. The piezo method is particularly preferred, for some reasons such as its low potential to affect the quality of the ink composition.

The ejection can be performed using a known ink jet recording apparatus. An ink jet recording apparatus is a device that makes recordings (printings) by applying droplets to a recording medium through ink jetting, or the ejection of small droplets of ink. Ink jet recording apparatuses have components such as a head (an ink jet head), an ink composition housing container, a recording medium transporter, and a control unit. The ink jet head is a recording head. The ink composition housing container is an ink cartridge. The recording medium transporter is a medium-feeding mechanism that transports the recording medium in the feeding direction. The control unit controls, for example, the operations of the ink jet recording apparatus.

Because of its higher viscosity than that of the ordinary aqueous ink compositions for use as ink jet recording inks, the ink composition according to the present invention experiences greater changes in viscosity than such aqueous ink compositions following temperature changes during ejection. It is preferred that the temperature of the ink composition be as constant as possible during ejection.

Curing

The ink composition on the recording medium is then cured through irradiation with ultraviolet radiation. This can be explained as follows. A photopolymerization initiator in the ink composition generates an active species, such as a free radical, an acid, or a base, in response to the ultraviolet radiation, and this active species promotes the polymerization of the polymerizable compounds. That is, the irradiation of ultraviolet radiation initiates the polymerization of the polymerizable compounds. Besides the photopolymerization initiator, the ink composition also contains a sensitizing dye aimed to expand the range of wavelengths that can be absorbed. The sensitizing dye becomes excited by absorbing the ultraviolet radiation. The excited sensitizing dye comes into contact with the photopolymerization initiator, promoting the decomposition of the initiator. As a result, curability with higher sensitivity is achieved.

In general, there are two commonly known light sources for the curing of ultraviolet-curable inks, a mercury lamp and a metal halide lamp. Furthermore, there is a strong desire for a mercury-free light source from the environmental protection perspective. Replacement of the existing ultraviolet light-emitting devices with GaN (gallium nitride) semiconductor-based ones would therefore be very beneficial, both industrially and environmentally. Ultraviolet-light emitting diodes (UV-LEDs) and ultraviolet-laser diodes (UV-LDs) are excellent light sources for ultraviolet-curable inks because of their small size, long life, high efficiency, and low cost. In particular, UV-LEDs, which are smaller in size and lower in cost, are preferred in the curing of the ink composition according to this embodiment.

The light source preferably has a peak emission wavelength of 365 nm to 405 nm. The peak emission wavelength is the wavelength at which the emission intensity of the light peaks. It is preferred that the ink composition be irradiated with a ray of ultraviolet radiation that has a peak emission wavelength in that range at an irradiation energy of less than 300 $mJ/cm^2$, more preferably less than 250 $mJ/cm^2$, even more preferably less than 200 $mJ/cm^2$, in particular less than 150 $mJ/cm^2$.

The ink composition according to this embodiment can be cured through exposure to a ray of light having a peak emission wavelength in the above range and with an amount of irradiation energy that falls within the above ranges. In such a case the ink composition cures with a small amount of irradiation energy and in a short period of time. Shortening the duration of curing leads to increasing the printing speed. The ink composition according to this embodiment can also be cured with a reduced irradiation dose, and this leads to system size and cost reduction, including the size of the light source. As mentioned above, the light source is preferably a UV-LED. The light source may have either one or multiple peak emission wavelengths in the above range. When the light source has multiple peak emission wavelengths, the overall irradiation energy of the ultraviolet radiation having these peak emission wavelengths is controlled to fall within the above range.

The ink composition according to this embodiment can be cured with the ink droplets on the medium having a dot height of 1 μm or more and 3 μm or less. In such a case the ink composition forms a thin coating, and the thickening of the recording associated with the coating is advantageously minor. Such an ink composition can be obtained by the methods described above.

In this embodiment, therefore, the ink composition gives coatings with improved strength (hardness and abrasion resistance) by virtue of the combination of an N-vinyl compound and a bifunctional monomer A. The low viscosity of the ink composition and the stretchability of the coatings are preserved. The ink composition also contains a mono-, bi-, or trifunctional urethane (meth)acrylate oligomer, which makes the coatings stronger and more flexible.

The ink composition gives coatings with further improved strength (hardness and abrasion resistance) when N-vinylcaprolactam and a predetermined amount of a cyclic (meth)acrylate monomer are used in combination with the bifunctional monomer A. The low viscosity of the ink composition and the stretchability of the coatings still remain. Adding a predetermined amount of a bifunctional urethane (meth)acrylate oligomer to these ingredients leads to further improved strength and flexibility of the coatings.

When additionally containing a predetermined amount of an acylphosphine oxide photopolymerization initiator and cured using an ultraviolet-light emitting diode (UV-LED) having a peak emission wavelength of 365 nm to 405 nm, furthermore, the ink composition cures efficiently with a small amount of irradiation energy.

In this way, there is provided an ultraviolet-curable ink jet ink composition that is superior in characteristics such as the stretchability, hardness, and abrasion resistance of the coatings and the curability and ejection stability of the ink.

The following describes the advantages of this embodiment in further detail by providing some examples and comparative examples in which ink compositions according to this embodiment were evaluated regarding stretchability, hardness, abrasion resistance, curability, and viscosity.

Preparation of Ink Compositions

Tables 1 to 3 summarize the formula of the ink compositions of Examples 1 to 15. Tables 4 and 5 summarize the formula of the ink compositions of Comparative Examples 1 to 6. The amounts of ingredients in these tables are in % by mass unless otherwise specified.

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Monofuctional monomer | n-Vc | 12.75 | 10.00 | 11.65 | 5.00 | 15.00 | 15.00 | 12.00 | 10.00 | 10.00 | 10.00 |
| Aromatic monofunctional monomer | PEA | 35.00 | 32.75 | 27.75 | 35.00 | 10.00 | 35.00 | 32.00 | 30.00 | — | 32.75 |
| | Epoxy ester M-600A | — | — | — | — | — | — | — | — | 32.75 | — |
| Alicyclic monofunctional monomer | IBXA | 5.00 | 10.00 | 15.00 | 5.75 | 5.00 | 15.00 | 12.00 | 10.00 | 10.00 | — |
| | FA-513AS | — | — | — | — | — | — | — | — | — | 10.00 |
| Bifunctional monomer | VEEA | 23.00 | 23.00 | 25.00 | 28.65 | 35.00 | 13.00 | 25.70 | 21.75 | 23.00 | 23.00 |
| Bifunctional UAO | CN991 | 8.65 | 8.65 | 5.00 | 10.00 | 14.40 | 7.40 | 8.70 | 8.65 | 8.65 | 8.65 |
| Tetrafunctional UAO | EBECRYL8210 | — | — | — | — | — | — | — | — | — | — |
| Hexfunctional UAO | EBECRYL1290 | — | — | — | — | — | — | — | — | — | — |
| Nonafunctional UAO | CN9013 | — | — | — | — | — | — | — | — | — | — |
| Acylphosphine oxide photopolymerization initiators | Irg819 | 5.00 | 5.00 | 5.00 | 5.00 | 7.00 | 4.50 | 2.00 | 7.00 | 5.00 | 5.00 |
| | TPO | 5.00 | 5.00 | 5.00 | 5.00 | 7.00 | 4.50 | 2.00 | 7.00 | 5.00 | 5.00 |
| Other additives | DETX | 2.00 | 2.00 | 2.00 | 2.00 | 3.00 | 2.00 | 2.00 | 2.00 | 2.00 | 2.00 |
| | MEHQ | 0.10 | 0.10 | 0.10 | 0.10 | 0.10 | 0.10 | 0.10 | 0.10 | 0.10 | 0.10 |
| | BYK-UV3500 | 0.50 | 0.50 | 0.50 | 0.50 | 0.50 | 0.50 | 0.50 | 0.50 | 0.50 | 0.50 |

TABLE 1-continued

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Carbon black | 2.00 | 2.00 | 2.00 | 2.00 | 2.00 | 2.00 | 2.00 | 2.00 | 2.00 | 2.00 |
| SOL36000 | 1.00 | 1.00 | 1.00 | 1.00 | 1.00 | 1.00 | 1.00 | 1.00 | 1.00 | 1.00 |
| Total | 100.00 | 100.00 | 100.00 | 100.00 | 100.00 | 100.00 | 100.00 | 100.00 | 100.00 | 100.00 |

TABLE 2

| | | Example 11 | Example 12 | Example 13 |
|---|---|---|---|---|
| Monofunctional monomer | n-Vc | 15.00 | 15.00 | 17.00 |
| Aromatic monofunctional monomer | PEA | 35.00 | — | 30.75 |
| | Epoxy ester M-600A | — | — | — |
| Alicyclic monofunctional monomer | IBXA | 15.00 | — | 9.00 |
| | FA-513AS | — | — | — |
| Bifunctional monomer | VEEA | 10.00 | 47.00 | 21.00 |
| Bifunctional UAO | CN991 | 9.40 | 18.40 | 6.65 |
| Tetrafunctional UAO | EBECRYL8210 | — | — | — |
| Hexafunctional UAO | EBECRYL1290 | — | — | — |
| Nonafunctional UAO | CN9013 | — | — | — |
| Acylphosphine oxide photopolymerization initiators | Irg819 | 5.00 | 7.00 | 5.00 |
| | TPO | 5.00 | 7.00 | 5.00 |
| Other additives | DETX | 2.00 | 2.00 | 2.00 |
| | MEHQ | 0.10 | 0.10 | 0.10 |
| | BYK-UV3500 | 0.50 | 0.50 | 0.50 |
| | Carbon black | 2.00 | 2.00 | 2.00 |
| | SOL36000 | 1.00 | 1.00 | 1.00 |
| Total | | 100.00 | 100.00 | 100.00 |

TABLE 3

| | | Example 14 | Example 15 |
|---|---|---|---|
| Monofunctional monomer | n-Vc | 12.75 | 12.75 |
| Aromatic monofunctional monomer | PEA | 35.00 | 35.00 |
| | Epoxy ester M-600A | — | — |
| Alicyclic monofunctional monomer | IBXA | 5.00 | 5.00 |
| | FA-513AS | — | — |
| Bifunctional monomer | VEEA | 23.00 | 23.00 |
| Bifunctional UAO | CN991 | — | 7.65 |
| Trifunctional UAO | EBECRYL8701 | 8.65 | — |
| Tetrafunctional UAO | EBECRYL8210 | — | 1.00 |
| Hexafunctional UAO | EBECRYL1290 | — | — |
| Nonafunctional UAO | CN9013 | — | — |
| Acylphosphine oxide photopolymerization initiators | Irg819 | 5.00 | 5.00 |
| | TPO | 5.00 | 5.00 |
| Other additives | DETX | 2.00 | 2.00 |
| | MEHQ | 0.10 | 0.10 |
| | BYK-UV3500 | 0.50 | 0.50 |
| | Carbon black | 2.00 | 2.00 |
| | SOL36000 | 1.00 | 1.00 |
| Total | | 100.00 | 100.00 |

TABLE 4

| | | Comparative Example 1 | Comparative Example 2 | Comparative Example 3 | Comparative Example 4 | Comparative Example 5 |
|---|---|---|---|---|---|---|
| Monofuctional monomer | n-Vc | — | 10.00 | 10.00 | 10.00 | 15.00 |
| Aromatic monofunctional monomer | PEA | 35.00 | 32.75 | 32.75 | 32.75 | 34.75 |
| | Epoxy ester M-600A | — | — | — | — | — |
| Alicyclic monofunctional monomer | IBXA | 15.00 | 10.00 | 10.00 | 10.00 | 15.00 |
| | FA-513AS | — | — | — | — | — |
| Bifunctional monomer | VEEA | 25.00 | 23.00 | 23.00 | 23.00 | — |
| Bifunctional UAO | CN991 | 9.40 | — | — | — | 19.65 |
| Tetrafunctional UAO | EBECRYL8210 | — | 8.65 | — | — | — |
| Hexfunctional UAO | EBECRYL1290 | — | — | 8.65 | — | — |
| Nonafunctional UAO | CN9013 | — | — | — | 8.65 | — |
| Acylphosphine oxide photopolymerization initiators | Irg819 | 5.00 | 5.00 | 5.00 | 5.00 | 5.00 |
| | TPO | 5.00 | 5.00 | 5.00 | 5.00 | 5.00 |
| Other additives | DETX | 2.00 | 2.00 | 2.00 | 2.00 | 2.00 |
| | MEHQ | 0.10 | 0.10 | 0.10 | 0.10 | 0.10 |
| | BYK-UV3500 | 0.50 | 0.50 | 0.50 | 0.50 | 0.50 |
| | Carbon black | 2.00 | 2.00 | 2.00 | 2.00 | 2.00 |
| | SOL36000 | 1.00 | 1.00 | 1.00 | 1.00 | 1.00 |
| Total | | 100.00 | 100.00 | 100.00 | 100.00 | 100.00 |

TABLE 5

|  |  | Comparative Example 6 |
|---|---|---|
| Monofunctional monomer | n-Vc | 12.75 |
| Aromatic monofunctional monomer | PEA | 40.65 |
|  | Epoxy ester M-600A | — |
| Alicyclic monofunctional monomer | IBXA | 8.00 |
|  | FA-513AS | — |
| Bifunctional monomer | VEEA | 23.00 |
| Bifunctional UAO | CN991 | — |
| Trifunctional UAO | EBECRYL8701 | — |
| Tetrafunctional UAO | EBECRYL8210 | — |
| Hexafunctional UAO | EBECRYL1290 | — |
| Nonafunctional UAO | CN9013 | — |
| Acylphosphine oxide photopolymerization initiators | Irg819 | 5.00 |
|  | TPO | 5.00 |
| Other additives | DETX | 2.00 |
|  | MEHQ | 0.10 |
|  | BYK-UV3500 | 0.50 |
|  | Carbon black | 2.00 |
|  | SOL36000 | 1.00 |
| Total |  | 100.00 |

Tables 1 to 5 include abbreviations as the names of materials. The details of the abbreviations are as follows.

n-VC . . . N-vinylcaprolactam (Tokyo Chemical Industry Co., Ltd.)

PEA . . . Phenoxyethyl acrylate (Osaka Organic Chemical Industry Ltd.)

Epoxy ester M-600A . . . 2-Hydroxy-3-phenoxypropyl acrylate (Kyoeisha Chemical Co., Ltd.)

IBXA . . . Isobornyl acrylate (Osaka Organic Chemical Industry Ltd.)

FA-513AS . . . Dicyclopentanyl acrylate (Hitachi Chemical Co., Ltd.)

VEEA . . . 2-(2-Vinyloxyethoxy)ethyl acrylate (Nippon Shokubai Co., Ltd.)

UAO . . . Urethane (meth)acrylate oligomer

MEHQ . . . p-Methoxyphenol (Wako Pure Chemical Industries, Ltd.)

The ink compositions of Examples and Comparative Examples were prepared in accordance with the formulae in Tables 1 to 5.

Of the compounds in Table 1, the monofunctional (meth)acrylate monomer was N-vinylcaprolactam (Tokyo Chemical Industry).

Of the compounds in Table 1, the aromatic monofunctional (meth)acrylate monomers were PEA (phenoxyethyl acrylate, Osaka Organic Chemical Industry) and epoxy ester M-600A (2-hydroxy-3-phenoxypropyl acrylate, Kyoeisha Chemical).

Of the compounds in Table 1, the saturated alicyclic monofunctional (meth)acrylate monomers were IBXA (isobornyl acrylate, Osaka Organic Chemical Industry) and FA-513AS (dicyclopentanyl acrylate, Hitachi Chemical).

Of the compounds in Table 1, the bifunctional (meth)acrylate monomer (monomer A) was VEEA (2-(2-vinyloxyethoxy)ethyl acrylate, Nippon Shokubai).

Of the compounds in Table 1, the bifunctional UAO was CN991 (Sartomer), the trifunctional UAO was EBECRYL 8701 (Daicel Cytec), the tetrafunctional UAO was EBECRYL 8210 (Daicel Cytec), the hexafunctional UAO was EBECRYL 1290 (Daicel Cytec), and the nonafunctional UAO was CN9013 (Sartomer).

Among the ingredients in Table 1, the acylphosphine oxide photopolymerization initiators were Irg819 (bis(2,4,6-trimethylbenzoyl)-phenylphosphine oxide, "trade name IRGACURE 819," BASF) and TPO (2,4,6-trimethylbenzoyl-diphenyl-phosphine oxide, "trade name IRGACURE TPO," BASF).

As for the other additives in Table 1, DETX (2,4-diethylthioxanthone, "trade name Speedcure DETX," Lambson) is a thioxanthone photopolymerization initiator. MEHQ (p-methoxyphenol, Wako Pure Chemical Industries) is a polymerization inhibitor. BYK-UV3500 (BYK Additives & Instruments) is a slipping agent. Carbon black (C.I. Pigment Black 7, Mitsubishi Chemical) is a pigment. SOL36000 (solsperse 36000 (Avecia)) is a dispersant.

In accordance with the formulae in Table 1, the solvents, photopolymerization initiators, and polymerization inhibitor were stirred for each of the ink compositions specified in the columns to give a mixed solvent. Part of the mixed solvent was mixed with solsperse 36000. The carbon black was dispersed using a homogenizer first and then a bead mill to give a dispersion with an average particle diameter of the pigment of 200 nm. This dispersion was mixed with the rest of the mixed solvent and BYK-UV3500. In this way, the ink compositions of Examples and Comparative Examples were obtained.

The ink composition of Example 1 is a level in which the PEA content was high and the IBXA content was low, both within a predetermined range. The ink composition of Example 3 is a level in which the IBXA content was high and the bifunctional urethane (meth)acrylate oligomer content was low, both within a predetermined range. The ink composition of Example 4 is a level in which the n-Vc content is low, the monomer A content is high, and the bifunctional urethane (meth)acrylate oligomer content was high, all within a predetermined range. The ink composition of Example 5 is a level in which the amounts of the cyclic monofunctional (meth)acrylate monomers PEA and IBXA were small and the amounts of the acylphosphine oxide photopolymerization initiators were large, all within a predetermined range. The ink composition of Example 6 is a level in which the amounts of n-Vc and the cyclic monofunctional (meth)acrylate monomers PEA and IBXA were large and the monomer A content was low, all within a predetermined range. The ink composition of Example 7 is a level in which the amounts of the acylphosphine oxide photopolymerization initiators were small within a predetermined range. The ink composition of Example 8 is a level in which the amounts of the acylphosphine oxide photopolymerization initiators were large within a predetermined range. The ink composition of Example 9 is a level in which the aromatic monofunctional (meth)acrylate monomer was epoxy ester M-600A (2-hydroxy-3-phenoxypropyl acrylate). The ink composition of Example 10 is a level in which the saturated alicyclic monofunctional (meth)acrylate monomer was FA-513AS (dicyclopentanyl acrylate).

The ink composition of Comparative Example 1 is a level in which no N-vinyl compound was contained. The ink composition of Comparative Example 2 is a level in which a tetrafunctional UAO was contained. The ink composition of Comparative Example 3 is a level in which a hexafunctional UAO was contained. The ink composition of Comparative Example 4 is a level in which a nonafunctional UAO was contained.

Evaluation of the Ink Compositions

The prepared ink compositions of Examples and Comparative Examples were then evaluated as follows. The results are summarized in Tables 6 to 8.

Viscosity

The viscosity of the ink composition at a temperature of 20° C. and a shear rate of 200 s$^{-1}$ was measured using a rheometer (Physica MCR-300). The grading criteria are as follows.

A=Less than 20 mPa·s
B=20 mPa·s or more and less than 30 mPa·s
C=30 mPa·s or more and less than 40 mPa·s
D=40 mPa·s or more Curability Test The ink composition was applied to Lumirror 125 E20 PET film (TORAY) using a bar coater (Dai-Ichi Rika) to a thickness of 2 m. The resulting coating was irradiated with a ray of light with a peak wavelength of 395 nm at an irradiation dose of 1 w/cm$^2$ using RX-Firefly UV-LED device (Phoseon). During this, the amount of energy required for the curing (a tack-free cure) of the ink composition was measured. To determine whether the ink composition cured, the coating irradiated with light was rubbed with a Johnson's cotton bud (Johnson & Johnson) under a load of 100 g. The ink composition was assessed as tack-free if the rubbed coating had no signs of rubbing. The grading criteria are as follows.

A=Less than 200 mJ/cm$^2$
B=200 mJ/cm$^2$ or more and less than 300 mJ/cm$^2$
C=300 mJ/cm$^2$ or more Evaluation of Coatings The ink compositions of Examples and Comparative Examples were then evaluated as follows regarding coatings they formed. The results are summarized in Tables 6 to 8.

Stretchability Test

Using a bar coater, the ink composition was applied to a PVC film (MACtac JT5829R) to a thickness of 10 m. The ink composition was then cured into a coating with a 400 mJ/cm$^2$ energy using a metal halide lamp (Eye Graphics). After removal of the release paper, the PVC film with the coating thereon was cut into a strip of 1 cm wide and 8 cm long. As a measure of stretchability, the percent elongation of this specimen of the ink composition was measured using a tensile tester (ORIENTEC TENSILON). The percent elongation at which the coating cracked was read. The grading criteria are as follows.

A=120% or more
B=80% or more and less than 120%
C=40% or more and less than 80%
D=Less than 40%

Hardness Test

The ink composition was applied to a polycarbonate substrate and cured into a coating under the same conditions as in the stretchability test. The hardness of the resulting coating was evaluated using a pencil hardness tester (Allgood) in accordance with JIS K5600-5-4, Scratch hardness (Pencil method). For evaluation, the surface of the 10-μm-thick coating was rubbed with the tip of pencils under a load of 750 g. The surface of the coating was then visually inspected, and the hardness of the hardest pencil that left no scratches was taken as the hardness of the coating. The grading criteria are as follows.

A=HB or harder
B=2B or harder and softer than HB
C=4B or harder and softer than 2B
D=Softer than 4B Abrasion Resistance Test In the curability test, the ink composition was cured into a tack-free, 8-μm-thick coating. The abrasion resistance of this coating was evaluated using a color fastness rubbing tester (TESTER SANGYO CO., LTD.) in accordance with JIS K5701 (ISO 11628) (specifying methods of testing lithographic inks, samples, and printings). For evaluation, the surface of the coating was rubbed with a piece of bond paper under a load of 500 g and then the condition of the rubbed coating was visually inspected. The grading criteria are as follows.

A: The piece of bond paper not stained. The recording surface not removed or damaged.
B: The piece of bond paper stained. The recording surface not removed or damaged.
C: The piece of bond paper stained. The recording surface removed and damaged.
D: The piece of bond paper stained. The recording surface removed.

TABLE 6

| Evaluation test | Example 1 | Example 2 | Example 3 | Example 4 | Example 5 | Example 6 | Example 7 | Example 8 | Example 9 | Example 10 |
|---|---|---|---|---|---|---|---|---|---|---|
| Coating stretchability | A | A | B | A | B | A | A | A | A | A |
| Pencil hardness | B | A | A | A | A | B | A | A | A | A |
| Coating abrasion resistance | A | A | A | A | B | A | A | A | A | A |
| Curability | A | A | A | A | A | A | B | A | A | A |
| Viscosity | A | A | A | B | A | A | A | B | B | A |

TABLE 7

| Evaluation test | Example 11 | Example 12 | Example 13 | Comparative Example 1 | Comparative Example 2 | Comparative Example 3 | Comparative Example 4 | Comparative Example 5 |
|---|---|---|---|---|---|---|---|---|
| Coating stretchability | A | B | A | D | C | D | D | A |
| Pencil hardness | B | B | B | A | A | A | A | C |

TABLE 7-continued

| Evaluation test | Example 11 | Example 12 | Example 13 | Comparative Example 1 | Comparative Example 2 | Comparative Example 3 | Comparative Example 4 | Comparative Example 5 |
|---|---|---|---|---|---|---|---|---|
| Coating abrasion resistance | A | B | B | B | A | A | A | C |
| Curability | B | B | A | A | A | A | A | D |
| Viscosity | B | B | B | D | C | D | D | D |

TABLE 8

| Evaluation test | Example 14 | Example 15 | Comparative Example 6 |
|---|---|---|---|
| Coating stretchability | B | B | D |
| Pencil hardness | B | B | A |
| Coating abrasion resistance | A | A | A |
| Curability | A | A | C |
| Viscosity | A | A | A |

As can be seen from Tables 6 to 8, Examples demonstrated that ink compositions offer superior stretchability, hardness, abrasion resistance, curability, and viscosity when the amounts of n-Vc, a cyclic monofunctional (meth)acrylate, monomer A, a bifunctional UAO, and acylphosphine oxide photopolymerization initiators in them fall within predetermined ranges. In particular, the ink formulae of Examples 2 and 10 were excellent in terms of coating stretchability, pencil hardness, coating abrasion resistance, curability, and viscosity as is demonstrated in Tables 6 and 7.

By contrast, Comparative Example 1, in Table 7, was inferior to Examples in terms of stretchability due to the omission of the N-vinyl compound. Comparative Examples 2 to 4 were inferior in stretchability and viscosity due to the presence of an UAO having four or more functionalities. Comparative Example 5 was inferior to Examples except in stretchability due to the omission of monomer A (VEEA).

The invention is not limited to the description of the embodiment above but may optionally be altered within the scope of the claims and without departing from the gist or ideas of the invention read from the entire specification. Ink compositions altered in such a way also fall within the technical scope of the invention.

The entire disclosure of Japanese Patent Application No. 2016-031692, filed Feb. 23, 2016 is expressly incorporated by reference herein.

What is claimed is:

1. A radiation-curable ink jet composition comprising:
   p-methoxyphenol as a polymerization inhibitor;
   monomer A represented by formula (1), a mono-, bi-, or trifunctional urethane (meth)acrylate oligomer, and an N-vinyl compound:

   $$CH_2=CR^1-COOR^2-O-CH=CH-R^3 \quad (1)$$

where $R^1$ denotes $-H$ or $-CH_3$, $R^2$ denotes an organic residue having 2 to 20 carbon atoms, and $R^3$ denotes a hydrogen atom or an organic residue having 1 to 11 carbon atoms, and
   wherein a content of the N-vinyl compound is in the range of 5-15% by mass of a total mass of the radiation-curable ink jet composition.

2. The radiation-curable ink jet composition according to claim 1, wherein:
   the N-vinyl compound is N-vinylcaprolactam; and
   the ink jet composition contains at least one cyclic monofunctional (meth)acrylate monomer, the at least one cyclic monofunctional (meth)acrylate monomer representing 15% by mass or more and 50% by mass or less of the total mass of the ink jet composition.

3. The radiation-curable ink jet composition according to claim 1, wherein the monomer A represents 13% by mass or more of a total mass of the ink jet composition.

4. The radiation-curable ink jet composition according to claim 2, wherein the at least one cyclic monofunctional (meth)acrylate monomer includes at least one of phenoxyethyl (meth)acrylate, 2-hydroxy-3-phenoxypropyl (meth)acrylate, and benzyl (meth)acrylate.

5. The radiation-curable ink jet composition according to claim 2, wherein the at least one cyclic monofunctional (meth)acrylate monomer includes at least one of isobornyl (meth)acrylate and dicyclopentanyl (meth)acrylate.

6. The radiation-curable ink jet composition according to claim 1, wherein the monomer A is 2-(2-vinyloxyethoxy)ethyl acrylate.

7. The radiation-curable ink jet composition according to claim 1, further comprising:
   an acylphosphine oxide photopolymerization initiator, the acylphosphine oxide photopolymerization initiator representing 3% by mass or more and 15% by mass or less of a total mass of the ink jet composition.

8. The radiation-curable ink jet composition according to claim 1, wherein the ink jet composition is cured with light from an ultraviolet-light emitting diode having a peak emission wavelength of 365 nm to 405 nm.

9. An ink jet recording method comprising irradiating a radiation-curable ink jet composition according to claim 1 with ultraviolet radiation on a recording medium.

10. An ink jet recording method comprising irradiating a radiation-curable ink jet composition according to claim 2 with ultraviolet radiation on a recording medium.

11. An ink jet recording method comprising irradiating a radiation-curable ink jet composition according to claim 3 with ultraviolet radiation on a recording medium.

12. An ink jet recording method comprising irradiating a radiation-curable ink jet composition according to claim 4 with ultraviolet radiation on a recording medium.

13. An ink jet recording method comprising irradiating a radiation-curable ink jet composition according to claim 5 with ultraviolet radiation on a recording medium.

14. An ink jet recording method comprising irradiating a radiation-curable ink jet composition according to claim 6 with ultraviolet radiation on a recording medium.

15. An ink jet recording method comprising irradiating a radiation-curable ink jet composition according to claim 7 with ultraviolet radiation on a recording medium.

16. An ink jet recording method comprising irradiating a radiation-curable ink jet composition according to claim 8 with ultraviolet radiation on a recording medium.

17. The radiation-curable ink jet composition according to claim 1, further comprising a saturated alicyclic monofunctional (meth)acrylic monomer, wherein a content of the saturated alicyclic monofunctional (meth)acrylic monomer is in the range of 3-30% by mass of the total mass of the radiation-curable ink jet composition.

18. A radiation-curable ink jet composition comprising:
- a monomer A represented by $CH_2\!\!=\!\!CR^1\!\!-\!\!COOR^2\!\!-\!\!O\!\!-\!\!CH\!\!=\!\!CH\!\!-\!\!R^3$, where $R^1$ denotes —H or —$CH_3$, $R^2$ denotes an organic residue having 2 to 20 carbon atoms, and $R^3$ denotes a hydrogen atom or an organic residue having 1 to 11 carbon atoms;
- a mono-, bi-, or trifunctional urethane (meth)acrylate oligomer;
- an N-vinyl compound; and
- at least one cyclic monofunctional (meth)acrylate monomer,
- wherein a content of the N-vinyl compound is in the range of 5-15% by mass of a total mass of the radiation-curable ink jet composition, and
- wherein a total content of the N-vinyl compound, the mono-, bi-, or trifunctional urethane (meth)acrylate oligomer, and the cyclic monofunctional (meth)acrylate monomer is 55.75% by mass or more.

19. The radiation-curable ink jet composition according to claim 18, further comprising p-methoxyphenol as a polymerization inhibitor.

\* \* \* \* \*